Nov. 18, 1947.  S. B. GRISCOM  2,431,244
HIGH VOLTAGE METERING APPARATUS
Filed June 8, 1946
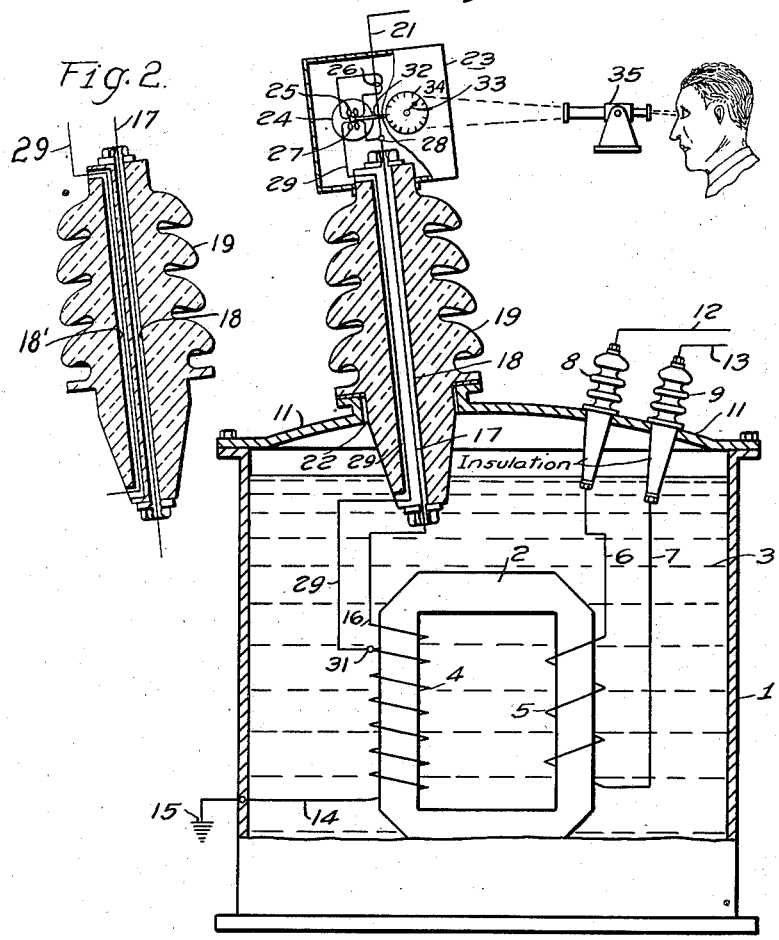
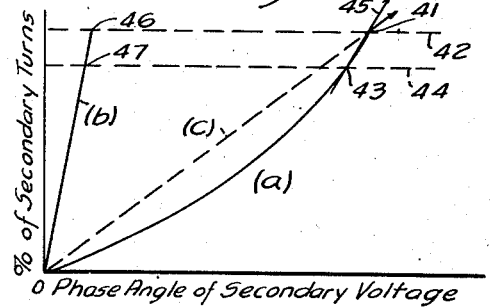
WITNESSES:  INVENTOR
  Samuel B. Griscom.
  BY
  ATTORNEY Patented Nov. 18, 1947

2,431,244

UNITED STATES PATENT OFFICE 2,431,244

HIGH-VOLTAGE METERING APPARATUS

Samuel B. Griscom, Wilkinsburg, Pa., assignor to Westinghouse Electric Corporation, East Pittsburgh, Pa., a corporation of Pennsylvania Application June 8, 1946, Serial No. 675,500

6 Claims. (Cl. 171—95)

My invention relates to electrical apparatus, and particularly to such apparatus in which a voltage source of accurate ratio and phase angle is desired at a high voltage above ground for testing or metering purposes.

My invention has application to an electrical transformer having a high voltage winding connected between a high voltage circuit conductor and ground and in which it is desired to meter the voltage of said winding or the power flow therethrough.

In high voltage electrical apparatus in which it is desired to obtain a voltage source for measuring the voltage across the apparatus, it is customary to apply the voltage of the apparatus across a potential transformer or a condenser type of potential device. When a high voltage is applied to a potential transformer the device becomes very large and expensive because of the necessity of insulating the transformer winding an amount depending upon the voltage impressed thereon. Condenser type potential devices are satisfactory for certain purposes where the measurement of voltage without relation to phase angle between the voltage and the current in the circuit is desired, and for operating relays or similar devices in response to particular voltages. In such cases precise voltage indications are not usually required.

In accordance with one aspect of the invention a meter is provided having a voltage element and a current element both connected to circuit conductors having a voltage with respect to ground, that is of the order of that of the high voltage terminal conductor of the high voltage winding of the apparatus. By mounting the meter element on the upper or outer end of a high voltage terminal bushing of the apparatus, circuit conductors may be connected to the various windings of the meter which have a potential that is high with respect to ground potential but in which the voltage between the several conductors connected to the windings of the meter is low with respect to each other.

It is an object of the invention to provide an electrical apparatus of the character described having a high voltage winding and a high voltage terminal bushing with a metering or testing device having metering elements or windings energized from relatively low voltage circuits, the conductors of which have a high voltage with respect to ground, the metering or testing device being so mounted that the parts thereof are at a high voltage with respect to ground.

Other objects and advantages of the invention will be apparent from the description of the preferred embodiment of the invention, reference being had to the accompanying drawing in which:

Figure 1 is a diagrammatic view, partly in section, of apparatus illustrating one preferred embodiment of the invention, Fig. 2 is a sectional view of a modified terminal voltage structure, and Fig. 3 is a view illustrating curves showing the relation between certain electrical quantities of the apparatus.

Referring to the drawing, and particularly to Fig. 1, an electrical transformer is illustrated having a casing 1, containing a magnetic core structure 2 immersed in a liquid dielectric 3 and having a high-voltage winding 4 and a low-voltage winding 5 wound thereon and inductively related to each other in a well known manner. The low-voltage winding 5 is connected by conductors 6 and 7 through low voltage bushings 8 and 9 that extend through openings in the cover 11 of the transformer casing, connecting the low-voltage winding 5 with circuit conductors 12 and 13 exterior to the transformer casing.

One end of the high voltage winding 4 is connected by a conductor 14 to ground at 15 and remains at ground potential. The other end 16 of the winding 4 is connected by a conductor 17 extending through a bore 18 in a high-voltage terminal bushing 19 to a high-voltage circuit conductor 21 exterior to the transformer case. The high-voltage terminal bushing 19 extends through an opening 22 in the transformer tank cover 11 and may be of any well known type, such as a condenser type bushing. For the purpose of simplicity in illustration, the busing 19 is shown as formed of any suitable insulating material.

A metering device 23 is illustrated as mounted on the upper or outer end of the bushing 19 and its various parts will have a potential, with respect to ground, of the general order of the high voltage line circuit conductor 21. The device 23 as illustrated comprises a wattmeter mechanism 24 having a current element shown as a winding 25 connected through a current transformer 26 to be responsive to the current flowing in the line circuit conductor 21. The wattmeter mechanism 24 also includes a voltage element 27, one end of which is connected to the line circuit conductor 21 at 28 and the other end of which is connected through conductor 29 to a point 31 on the high-voltage winding 4 that is relatively near the high-voltage end of the high voltage winding 4 so that the voltage applied to the winding 27 will correspond to the voltage across one or a few end turns of the winding 4. This voltage between points 16 and 31 will be a measure of the voltage across the winding 4 and since it is taken adjacent the high-voltage end of the winding, the potential difference between the conductors 29 and 17 is relatively small, although these conductors are at a potential that is high with respect to ground potential. Likewise, the opposite voltage from the ends of the current transformer 26, that is applied to the current element 25 of the wattmeter mechanism, is relatively small, although the potential of the conductors connecting the transformer 26 to the element 25 are at a high potential with respect to ground. The conductors 17 and 29 will be suitably insulated from each other in any satisfactory manner so as to withstand the relatively small voltage between them. This may be done by providing two separate bores lengthwise through the bushing 19, as shown at 18 and 18' in Fig. 2, for accommodating the two separate conductors 17 and 29, respectively or by otherwise providing the required insulation between the conductors 17 and 29 in a single bore 18.

The wattmeter mechanism 24 of the metering device 23 includes a mechanical element connected by a shaft 32 to the hand 33 of a clock mechanism on the exterior of the casing, the hand moving along a suitable dial 34 indicating the operation of the device. Since the entire metering device 23 is at high potential with respect to ground, a person cannot approach closely to it. A suitable reading glass or telescope 35 is therefore provided and located a sufficient distance from the metering device 23 so that a person may observe the position of the indicating hand 33 without coming dangerously close to the electrical apparatus.

Referring to Fig. 3 of the drawing the vertical axis reading from the bottom upwardly indicates per cent of secondary winding turns and the horizontal axis reading from left to right indicates the phase angle of the secondary voltage with respect to current. The curve $a$ is illustrative of the variation of the phase angle of the individual turns of a winding of a conventional potential transformer. Referring to point 41 (or to any point on the curve $a$ near the upper end thereof) it will be apparent that a potential coil located near the line end of the winding may differ considerably in phase angle from the terminal voltage of the entire winding. This is because a potential transformer will normally have high reactance compared to the capacitance charging currents. The curve $b$ is a similar type of curve showing a variation in phase angle of the secondary voltage across the tapped section of the high-voltage winding 4, that is, between the points 16 and 31 of a power transformer.

In a power transformer the ratio of reactance to capacitance in the winding may be in the range of from $\frac{1}{10}$ to $\frac{1}{100}$ of that of a potential transformer.

The full voltage of a winding is represented by the value indicated by the vertical distance between the horizontal base line in Fig. 3 and the dotted line 42, and the voltage of the winding to the tapped point is represented by the vertical distance between the base line and the dotted line 43. It follows that the voltage across the tapped portion of the winding is represented by the vertical distance between the horizontal lines 42 and 44. Referring to the curve $a$ this voltage, in the case of a potential transformer, corresponds to the voltage between the points 41 and 43 on the curve $a$. It will be noted that the direction between these two points indicated by the arrow 45 differs considerably from the direction of the curve $c$ representing the phase position of the voltage across the entire winding, namely from the point 0 to the point 41. On the other hand it will be noted that the curve $b$ is substantially a straight line, so that the vector position of the line between the points 46 and 47, where this curve intersects the horizontal lines 42 and 43, respectively, is substantially the same direction as the overall direction of the curve $b$. Therefore a voltage value taken between the points 46 and 47 is accurate as a measure of the phase direction of the curve $b$.

Modification in the parts of the apparatus illustrated and described within the spirit of my invention, will appear to one skilled in the art, and I do not wish to be limited otherwise than by the scope of the appended claims.

I claim as my invention:

1. In an electrical apparatus, a metal casing, a high-voltage electrical winding therein, a high-voltage insulating terminal bushing extending through a wall of the casing and having a bore extending therethrough, a terminal conductor connected to the high voltage end of the winding and extending through the bore in the bushing, a tap conductor extending from a point in said winding adjacent the high-voltage end thereof through the bushing to the outer end thereof, and an electrical meter mounted on the outer end of said terminal bushing and having a winding connected between said tap conductor and said terminal conductor.

2. In an electrical apparatus, a metal casing, a high-voltage electrical winding therein, a high-voltage insulating terminal bushing extending through a wall of the casing and having a bore extending therethrough, a terminal conductor connected to the high-voltage end of the winding and extending through the bore in the bushing, a tap conductor extending from a point in said winding adjacent the high-voltage end thereof through the bushing to the outer end thereof, an electrical meter mounted on the outer end of said terminal bushing and having a winding connected between said tap conductor and said terminal conductor, and a second winding connected to be responsive to the current flowing in the terminal conductor.

3. An electrical apparatus, a metal casing, a high-voltage electrical winding therein, a high-voltage insulating terminal bushing extending through a wall of the casing and having a bore extending therethrough, a terminal conductor connected to the high-voltage end of the winding and extending through the bore in the bushing, a tap conductor extending from a point in said winding adjacent the high-voltage end thereof through the bushing to the outer end thereof, and an electrical meter mounted on the outer end of said terminal bushing having a voltage element connected between said tap conductor and said terminal conductor and a current element connected to be responsive to the current flowing in the terminal conductor.

4. In an electrical apparatus, a metal casing, a high-voltage electrical winding therein, a high-voltage terminal bushing extending through a wall of the casing and having bore means extending lengthwise therethrough for accommodating two separate electrical conductors, a terminal conductor extending through said bore means and connected to the high-voltage end of the winding, a tap conductor extending through the said bore means and connected to a tap point in said winding, an electrical meter mounted on the outer end of said terminal bushing and having a winding connected between said tap conductor and said terminal conductor, and a second winding connected to be responsive to the current flowing in the terminal conductor.

5. In an electrical transformer, a metal casing, a low-voltage winding and a high-voltage winding within the casing inductively related to each other, the high-voltage winding having one end connected to ground potential and the other end arranged to be connected to a high-voltage electrical circuit conductor, a high-voltage insulating terminal bushing extending through a wall of the casing and having a bore extending lengthwise therethrough, a terminal conductor connected to the high-voltage end of the winding and extending through the bore in the bushing, a tap conductor extending from a point in said winding adjacent the high-voltage end thereof through the bushing to the outer end thereof, and an electrical meter mounted on the outer end of said terminal bushing and having a winding connected to be responsive to the voltage between said tap conductor and said terminal conductor, and a second winding connected to be responsive to the current flowing in the terminal conductor.

6. In an electrical apparatus, a metal casing, a high-voltage electrical winding therein, a high-voltage terminal bushing extending through a wall of the casing and having two separate bores extending lengthwise therethrough, a terminal conductor extending through one of said bores and connected to the high-voltage end of the winding, a tap conductor extending through the other of said bores and connected to a point in said winding, an electrical meter mounted on the outer end of said terminal bushing and having a winding connected between said tap conductor and said terminal conductor, and a second winding connected to be responsive to the current flowing in the terminal conductor.

SAMUEL B. GRISCOM.